W. W. FERRIS.
MOUNTING FOR RIMLESS EYEGLASSES.
APPLICATION FILED SEPT. 3, 1914.

1,262,475.  Patented Apr. 9, 1918.

Witnesses.
J. H. Thurston
John Henshaw

Inventor
William W. Ferris,
By Wilmarth H. Thurston,
Attorney.

UNITED STATES PATENT OFFICE.

WILLIAM W. FERRIS, OF PROVIDENCE, RHODE ISLAND, ASSIGNOR TO EDGAR W. MARTIN, OF BARRINGTON, RHODE ISLAND, LAURENCE C. MARTIN, OF PROVIDENCE, RHODE ISLAND, GEORGE C. BLEECKER, OF CHICAGO, ILLINOIS, AND WESLEY C. MARTIN, OF PROVIDENCE. RHODE ISLAND, TRUSTEES OF THE MARTIN-COPELAND COMPANY.

MOUNTING FOR RIMLESS EYEGLASSES.

1,262,475. Specification of Letters Patent. Patented Apr. 9, 1918.

Application filed September 3, 1914. Serial No. 860,022.

*To all whom it may concern:*

Be it known that I, WILLIAM W. FERRIS, of Providence, county of Providence, and State of Rhode Island, have invented certain new and useful Improvements in Mountings for Rimless Eyeglasses; and I do hereby declare the following specification, taken in connection with the accompanying drawings, forming a part of the same, to be a full, clear, and exact description thereof.

The invention relates to eyeglasses, spectacles and the like, and more particularly to frameless devices of this class, and has for its principal object to firmly secure the lenses and their uniting and supporting parts without the drilling of holes in the lenses that is necessary where the usual screw or rivet form of fastening is employed, or without the forming of indentations or projections or otherwise treating the lens in any manner whatsoever.

A further object of the invention is to provide simple, reliable and efficient means for mounting optical lenses which is adapted to be quickly secured to the lenses by the application of heat thereto.

To these ends the invention consists of the novel combination and arrangement of parts hereinafter described and more particularly set forth in the claims. In describing the invention in detail reference will be made to the accompanying drawings, in which—

Figure 1:
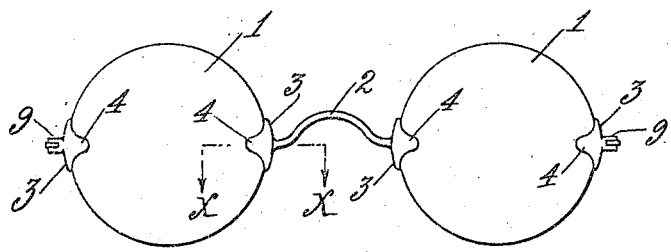
Figure 1 is a front elevation of a pair of spectacles provided with my novel features of invention.
Figure 2:
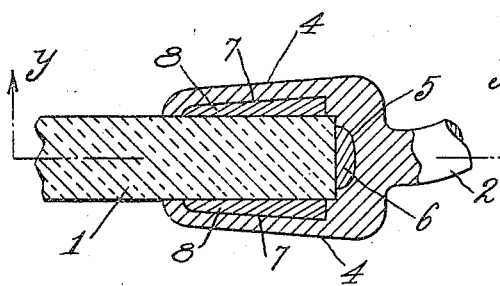
Fig. 2 is an enlarged sectional view on line *x—x*, Fig. 1.
Figure 3:
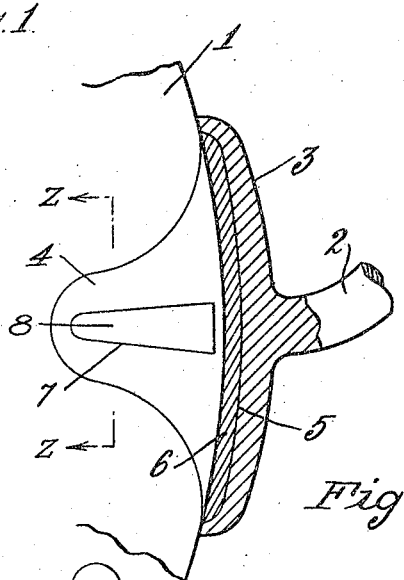
Fig. 3 is a sectional view on line *y—y*, Fig. 2.
Figure 4:
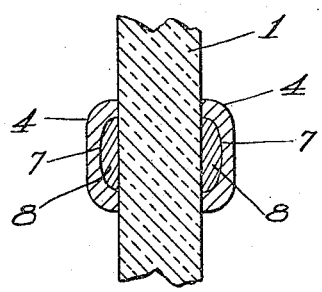
Fig. 4 is a sectional view on line *z—z*, Fig. 3.

Referring to the drawings, 1 represents the lenses of a pair of spectacles or eyeglasses. Formed integral with or secured to the nose-piece 2 at each end thereof is a curved shoe 3 arranged to conform to the curvature of the edge of the lens 1 and provided with integral strap-members 4, as shown in Fig. 1. Each of the strap-members 4 is preferably comparatively thick and wide at the inner end and gradually tapers in width and thickness toward the outer free end, as shown in Figs. 1 and 2. The shoe 3 is provided upon the inner surface with an elongated longitudinal recess or cavity 5 in which is plated or attached a quantity of lacquer or other heat-actuated fastening medium 6.

Figure 5:
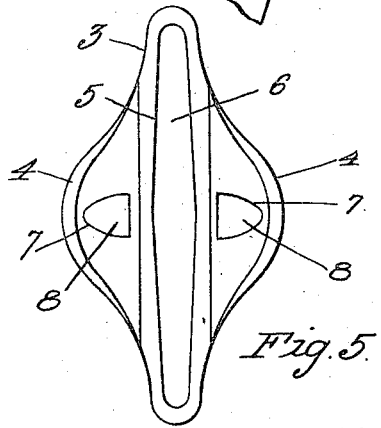
Fig. 5 is a front elevation of my novel strap in open position.

Each of the strap-members 4 is provided upon the inner surface with a recess or cavity 7, in which is plated or attached a quantity of lacquer or other heat-actuated fastening medium 8, as shown in Figs. 2 and 5.

Mounted upon the other edge of the lens 1 is a stud 9, which is adapted for the attachment of a temple-bow such as is used in spectacles. The stud 9 is provided with a curved shoe 3 and strap-members 4 of the same construction as those upon the ends of the nose-piece.

In mounting the lens 1 in the nose-piece 2, or in the studs 9, one end is inserted between the strap-members 4, which have been adjusted to frictionally engage the lateral faces of the lens, until the curved edge engages the inner face of the shoe 3. A small amount of heat, such as the flame of an ordinary match, is then applied to the exterior surface of the shoe 3 and strap members 4, whereupon the lacquer in the cavities 5 and 7 will flow. As soon as the lacquer commences to flow, the lens 1 is pressed firmly against the shoe 3 and the parts allowed to cool, whereupon the mounting will be securely fastened upon the lens.

With the above construction, it will be seen that the eyeglass mountings are made with the heat-actuated fastening medium constituting a part thereof, so that all the optician or user has to do in securing the mountings upon the lens is to apply the heat.

Furthermore, it will be seen that by having the heat-actuated fastening medium located in the cavities, the pressure of the lens against the shoe will not squeeze or force out any of said fastening medium, which would be the case if it were applied to the plain surface. With this construc tion, also, the outer edges of both the shoe and the strap-members can be brought into close contact with the lens and a perfect joint between the same effected.

It will also be seen that by making the strap-members comparatively thick at their inner ends where they join the shoe-member, any liability or tendency of said strap-members to open or spread when lateral pressure is applied to the lens will be obviated and a firm and strong mounting will be produced.

What I claim as my invention and desire to secure by Letters Patent is:—

1. An article of the character described, comprising a curved shoe having an elongated longitudinal recess upon the inner surface and two strap-members extending therefrom.

2. An article of the character described, comprising a curved shoe having an elongated longitudinal recess upon the inner surface of less width than said inner surface, and two strap-members each having a recess upon its inner surface.

3. An article of the character described, comprising a curved shoe-member having an elongated recess upon the inner surface, a heat-actuated fastening medium attached to said shoe-member within said recess, and two strap-members formed integral with said shoe-member.

4. An article of the character described, comprising a curved shoe-member having an elongated recess of less width than the inner surface thereof, a heat-actuated fastening medium attached to the surface of said recess, two strap-members, a longitudinal recess in each strap-member, and a heat-actuated fastening medium attached to the surface of each of said recesses.

5. The combination with a lens of a mounting comprising two strap-members and a heat-actuated fastening medium for securing said mounting to said lens.

6. The combination with a lens of a nose-piece provided at its end with a curved shoe having an elongated recess of less width than the thickness of the lens, two strap-members each having a recess in its inner surface and a heat-actuated fastening medium for securing said shoe and said strap-members to said lens.

7. In an ophthalmic mounting, the combination with a strap member in the form of a laterally open box, of a heat actuable adhesive formed on and adhering to the inner face of the strap, whereby heating of the strap will soften the adhesive to cause it to firmly engage and secure a lens as pressed into the strap.

8. As an article of manufacture, an eyeglass strap comprising a box portion adapted to embrace the lens, and a heat actuable adhesive lining carried by the inner face of the strap, whereby the strap may at any time be attached to or detached from a lens by simply heating there .

9. As an article of manufacture, a mount for an ophthalmic lens, comprising a strap having edge engaging and side engaging portions for coöperating with the lens, and a hardened adhesive adhering to and lining the strap, whereby heating thereof will soften the same to a condition to satisfactorily adhere to and secure a lens within the strap, substantially as and for the purpose described.

WILLIAM W. FERRIS.

Witnesses:
W. H. THURSTON,
J. H. THURSTON.